United States Patent
Zehner et al.

(12) 
(10) Patent No.: US 7,024,817 B2
(45) Date of Patent: Apr. 11, 2006

(54) MAGIC BEAN WISHES

(76) Inventors: Jeffrey Zehner, 202 Rebecca Sq., Pittsburgh, PA (US) 15209; Erika Zehner, 202 Rebecca Sq., Pittsburgh, PA (US) 15209

(*) Notice: Subject to any disclaimer, the term of this patent is extended or adjusted under 35 U.S.C. 154(b) by 0 days.

(21) Appl. No.: 10/917,783

(22) Filed: Aug. 14, 2004

(65) Prior Publication Data

US 2006/0032126 A1    Feb. 16, 2006

(51) Int. Cl.
*A01C 1/00* (2006.01)
*A01C 1/06* (2006.01)

(52) U.S. Cl. .................. 47/57.6; 47/58.1 SE
(58) Field of Classification Search .............. 47/61, 47/14, 57.6, 58.1 SE, 56, DIG. 9; 216/28, 216/65, 94; 19/6
See application file for complete search history.

(56) References Cited

U.S. PATENT DOCUMENTS

| | | | | |
|---|---|---|---|---|
| 2,281,927 A | * | 5/1942 | Fischer | 47/56 |
| 3,098,320 A | * | 7/1963 | Estkowski | 47/56 |
| 3,098,321 A | * | 7/1963 | Estkowski et al. | 47/56 |
| 3,754,643 A | * | 8/1973 | Foster | 206/408 |
| 3,908,308 A | * | 9/1975 | Meyers | 47/56 |
| 4,080,755 A | * | 3/1978 | Crosby | 47/56 |
| 4,353,183 A | * | 10/1982 | Estkowski | 47/56 |
| 4,442,627 A | * | 4/1984 | Adams et al. | 47/56 |
| 4,761,423 A | * | 8/1988 | Szego et al. | 514/395 |
| 4,853,429 A | * | 8/1989 | Sannan et al. | 524/29 |
| 5,099,772 A | * | 3/1992 | Murray | 111/92 |
| 5,106,649 A | * | 4/1992 | Spicer et al. | 427/4 |
| 5,720,129 A | * | 2/1998 | Lantinberg | 47/56 |
| 6,107,051 A | * | 8/2000 | Job et al. | 435/7.92 |
| 6,322,862 B1 | * | 11/2001 | Sakai | 428/13 |
| 6,334,856 B1 | * | 1/2002 | Allen et al. | 604/191 |
| 6,543,460 B1 | * | 4/2003 | Denes et al. | 134/1.1 |
| 6,688,041 B1 | * | 2/2004 | Babler et al. | 47/57.6 |
| 6,843,187 B1 | * | 1/2005 | Wimer et al. | 111/200 |

FOREIGN PATENT DOCUMENTS

EP    0619062 A1 * 10/1994
FR    2707832 A  *  1/1995

OTHER PUBLICATIONS

Shirehill Creations, "Name on Rice", Nov. 19, 2002.*
Carnicelli, Teri, "Cut to it: Engraving can add distinction to almost any promotional product", Jun. 19, 2000.*
Jones, Alice Smith, "Land Use Issues", Jul. 11, 1997.*

* cited by examiner

*Primary Examiner*—Son T. Nguyen
(74) *Attorney, Agent, or Firm*—Richard K. Thomson

(57) ABSTRACT

A novelty item and method of making same, include a non-germinated dicot seed with a word, symbol, or the like, etched through the seed coating to the cotyledon which remains visible from the time the seedling sprouts through the surface of the soil throughout the germination period.

4 Claims, 3 Drawing Sheets

MAGIC BEAN WISHES

BACKGROUND AND SUMMARY OF THE INVENTION

The present invention is directed to a novelty item. More particularly, the present invention is directed to the novelty item as well as a method of making the item, in which the novelty item is comprised of a bean or similar dicot seed, which is etched with an encouraging word, symbol, or the like, so the word becomes and remains visible throughout the germination period.

Since the travesty of September 11, many people have become discouraged, some even to the point of despair. Various items, including greeting cards, have been developed to send words of comfort and encouragement to family and friends. While well intended and, most often, well received, the effects of these encouraging words are short lived.

It is the purpose of the present invention to provide a novelty item which can provide words of encouragement which will continue to provide uplifting thoughts for several weeks. The novelty item of the present invention comprises a non-germinated dicot seed with a word, symbol, or the like, etched through its seed coat into its cotyledon whereby said word, symbol, or the like, will remain visible during the germination period of a resulting plant. These words, symbols, or the like, include encouraging words, namely, the words courage, dream, hope, love, peace, trust.

A second aspect of the invention is the method of making these novelty items. The inventive steps include a) obtaining a non-germinated dicot seed; b) etching said dicot seed's cotyledon through its seed coat with a word, symbol, or the like, which will continue to appear on said dicot seed throughout its gemination. The etching step is preferably done with a laser effectively branding the surface of the seed with the word or symbol. As the seed germinates into a plant over a period of several weeks, the word or symbol emerges from the soil and remains visible throughout the germination period. Several different words or symbols can be packaged together. The novelty item of the present invention is currently being marketed under the name MAGIC BEAN WISHES™.

Various other features, advantages and characteristics of the present invention will become apparent to one of ordinary skill in the art after a reading of the following specification.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF PREFERRED EMBODIMENT(S)

Figure 1:
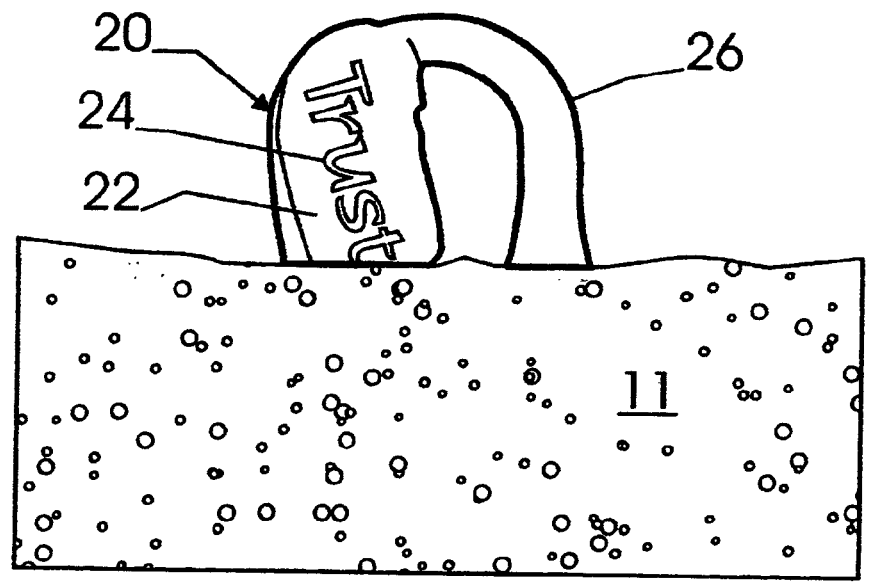
FIG. 1 is a schematic side view of a first embodiment of the novelty item of the present invention as the dicot seed emerges from the soil.
Figure 2:
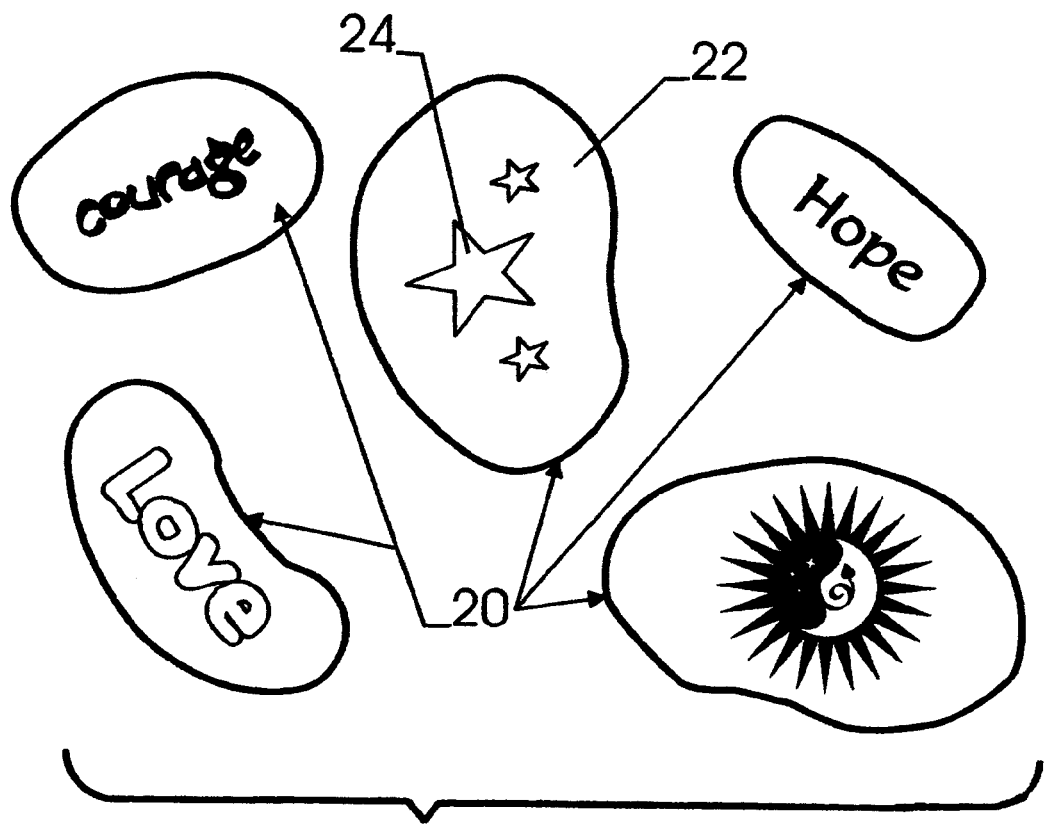
FIG. 2 is a collection of dicot seeds etched with various words and symbols as might be sold in a single package.
Figure 3:
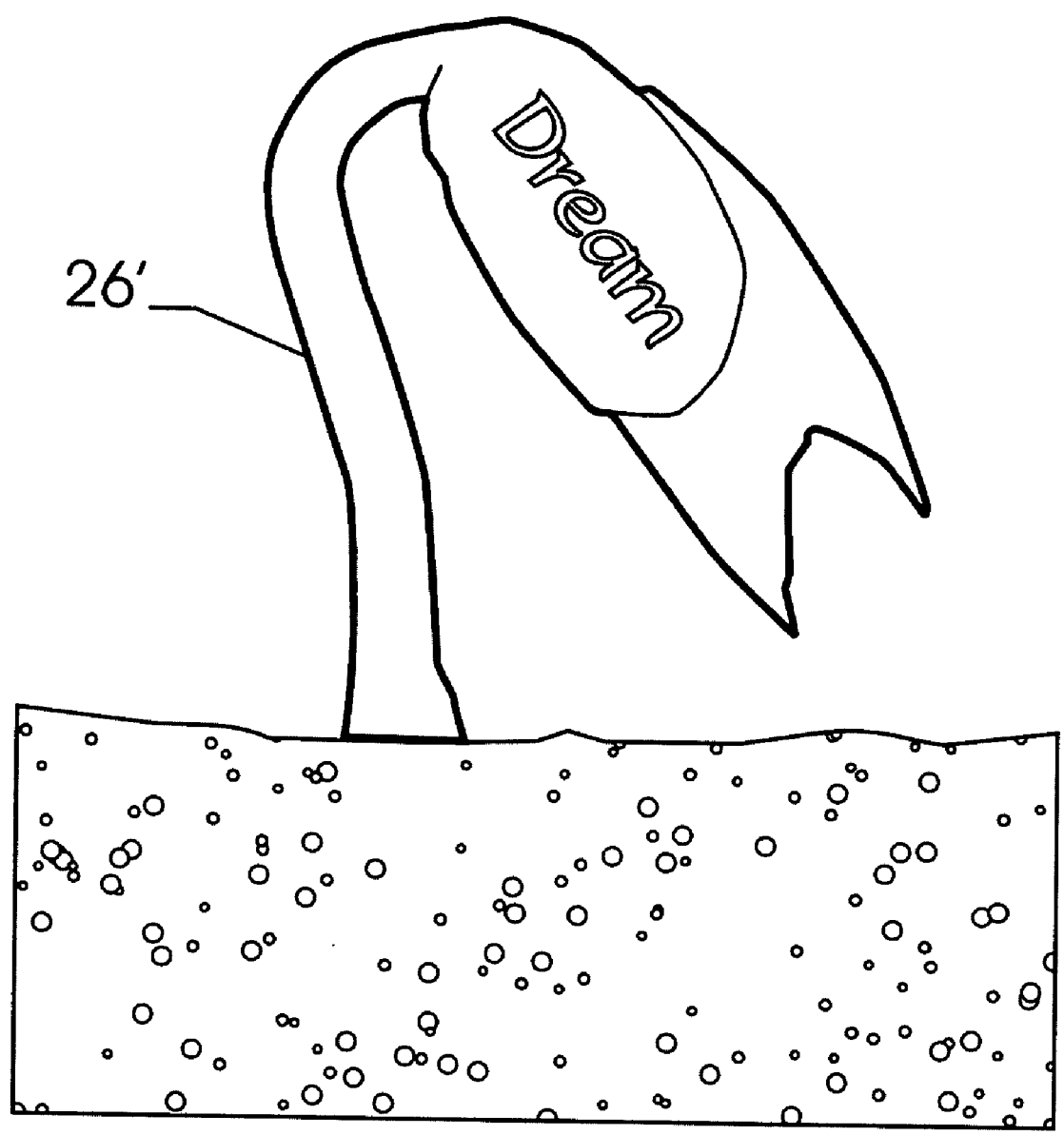
FIG. 3 is a schematic side view of a second dicot seed at a later stage of development.
Figure 4:
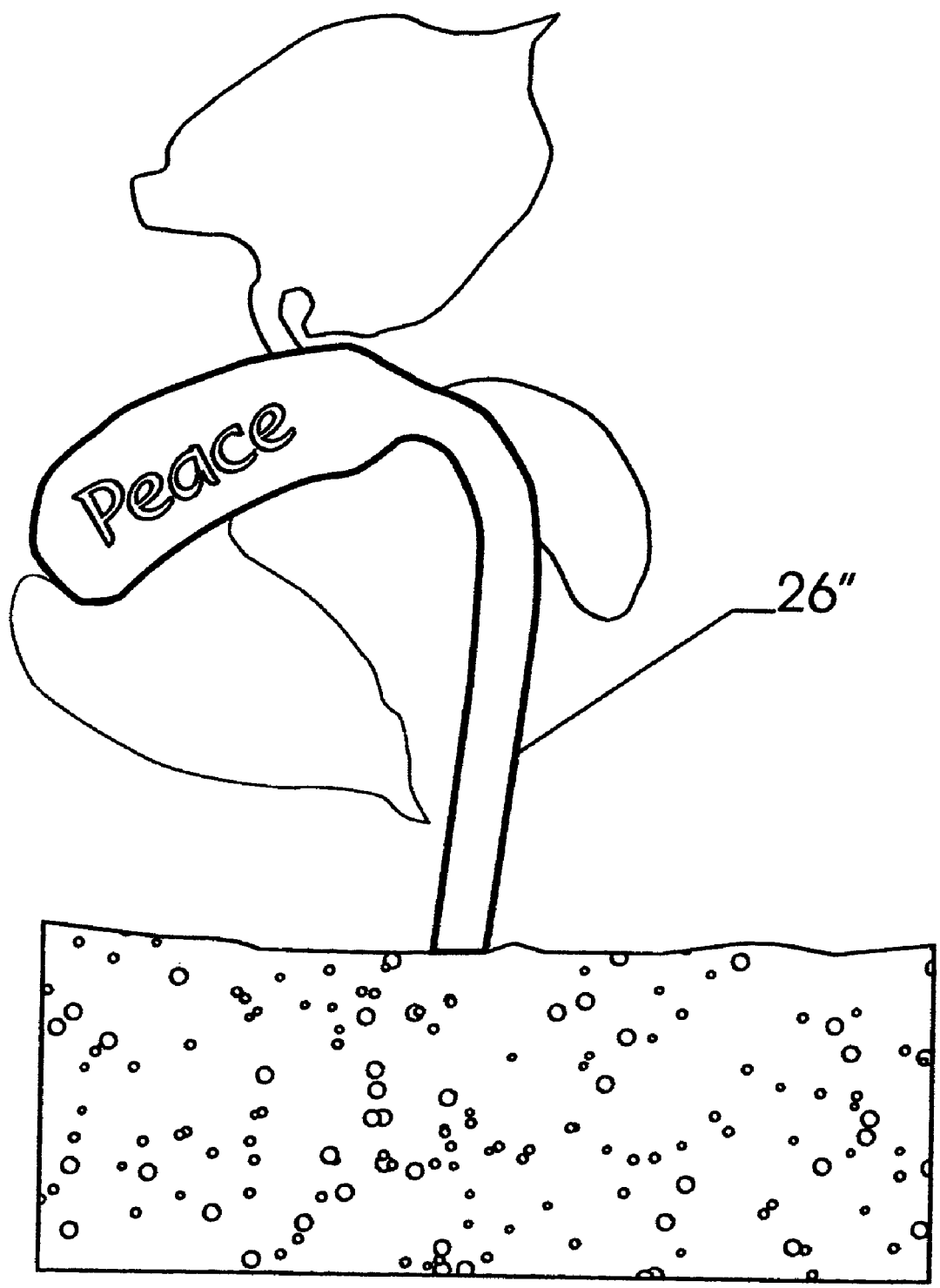
FIG. 4 is a side view of a third dicot seed with leaves emerging and the encouraging word still visible.

The present invention is directed to a novelty item shown in FIGS. 1–4 generally at 20. The novelty item comprises a non-germinated dicot seed such as a bean seed, with an encouraging word, symbol, or the like, etched through the seed cover 22 into the seed's cotyledon 24. This etching effectively brands the seed such that as it germinates, the etched feature remains visible. In FIG. 1, a seedling 26 is just sprouting from the soil 11. In FIG. 3, a more mature seedling 26' still has the encouraging word visible and, in FIG. 4, even when the seedling 26" sprouts leaves, the encouraging message remains visible. This germination period typically lasts for several weeks and may span more than a month. Unlike a greeting card which conveys an uplifting message with a very short term effect, each new day depicts a growth of the sentiment with the growth of the seedling. While these etched words and symbols may include anything from an age, for a birthday greeting, to company logos, to encouraging words such as, for example, courage, dream, hope, love, peace, trust. Obviously, other words or symbols, and the like, for specific observances could be employed without departing from the spirit of the invention.

The method of creating the novelty item of this invention comprises the steps of selecting an appropriate non-germinated dicot seed and etching through the seed coat to the cotyledon a word, symbol or the like. This etching is most preferably performed with a laser to effect a permanent marking which is equivalent of a branding. Seeds may be packaged in containers which hold a plurality of such seeds with a variety of different words, symbols, or the like, etched thereon. This product is being marketed under the trademark MAGIC BEAN WISHES™.

Various changes, alternatives and modifications will become apparent to one of ordinary skill in the art following a reading of the foregoing specification. It is intended that any such changes, alternatives and modifications as fall within the scope of the appended claims be considered part of the present invention.

We claim:

1. A method of creating a novelty item comprising the steps of
   a) obtaining a non-germinated dicot seed;
   b) etching said dicot seed's cotyledon through its seed coat with a word or symbol, which will continue to appear on said dicot seed throughout its gemination as said seed coat splits and is carried above an upper surface of a soil in which said seed is planted by a stalk of said resulting plant.

2. The method of claim 1 wherein said etching step is performed with a laser.

3. The method of claim 1 further comprising collecting a plurality of said dicot seeds into a package for purchase.

4. The method of claim 3 wherein at least two of said dicot seeds have different words, symbols, etched thereon.

* * * * *